Patented Aug. 25, 1931

1,820,601

UNITED STATES PATENT OFFICE

GEORGES PAUL DESPRET, OF PARIS, FRANCE, ASSIGNOR TO COMPAGNIES REUNIS DES GLACES & VERRES SPECIAUX DU NORD DE LA FRANCE, OF BOUSSOIS-SUR-SAMBRE, NORD, FRANCE

WIND SCREENS AND GLAZING FOR MOTOR AND OTHER VEHICLES

No Drawing. Application filed March 21, 1929, Serial No. 349,001, and in France May 1, 1928.

In collisions between motor vehicles, trains, tramcars and the like serious accidents, even causing loss of life, are due to the breakage of glass panes of the windows, which form pieces of glass which are often very sharp and will cause severe wounds. All such prejudice is occasioned by the nature of the glass, which is essentially fragile and brittle.

The present invention has for its object to obviate such drawbacks, and is characterized in that it resides in the use, for the manufacture of wind screens and glass windows for motor and like vehicles, of panes or plates of hardened glass obtained in the known manner, such glass being much stronger, and when broken, forming a great number of small fragments which are relatively harmless. As is well known, hardened glass is obtained by suddenly cooling hot glass, for instance by dipping a sheet of glass into a bath of oil, melted wax or other suitable material, or by subjecting said sheet of glass to an intense jet of air.

This particular use of hardened glass will offer a very important result, this being the safety afforded to the users of motor or other vehicles, since the major part of the serious accidents caused by the breakage of windows will now be obviated. This is due to the fact that the hardened glass panes or plates will resist shocks much better than the ordinary glass panes, so that in many cases all breakage will be obviated, and also due to the fact that if broken, such panes will form a great number of small fragments which cannot cause serious wounds.

Having now described my invention what I claim as new and desire to secure by Letters Patent is:

In a wind shield adapted for use upon motor cars and other vehicles, the use of a sheet or panel of hardened glass for constituting the transparent part of the windshield, so that and due to the property of hardened glass of resisting shocks and, when broken, to break in a crowd of very small fragments, the danger for the passengers of being severely injured by glass pieces will be much reduced.

In testimony whereof I have signed my name to this specification.

GEORGES PAUL DESPRET.